(12) United States Patent
Arzberger et al.

(10) Patent No.: US 8,220,346 B2
(45) Date of Patent: Jul. 17, 2012

(54) POSITIONING DEVICE FOR A ROD-SHAPED MEASURING APPARATUS

(75) Inventors: Matthias Arzberger, Mülheim a. d. Ruhr (DE); Josef Deussen, Heinsberg (DE); Markus Reifferscheid, Korschenbroich (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 322 days.

(21) Appl. No.: 12/449,282

(22) PCT Filed: Dec. 13, 2007

(86) PCT No.: PCT/EP2007/010927
§ 371 (c)(1),
(2), (4) Date: Jul. 31, 2009

(87) PCT Pub. No.: WO2008/092497
PCT Pub. Date: Aug. 7, 2008

(65) Prior Publication Data
US 2010/0037689 A1 Feb. 18, 2010

(30) Foreign Application Priority Data

Feb. 2, 2007 (DE) .................. 10 2007 006 060
Apr. 11, 2007 (DE) .................. 10 2007 017 336
Aug. 10, 2007 (DE) .................. 10 2007 037 684

(51) Int. Cl.
*G01D 11/18* (2006.01)
*G01K 1/14* (2006.01)

(52) U.S. Cl. ....................... 73/866.5; 374/208
(58) Field of Classification Search .......... 73/866.5; 374/208, 209
See application file for complete search history.

(56) References Cited

U.S. PATENT DOCUMENTS

| | | | |
|---|---|---|---|
| 3,681,990 A | 8/1972 | Barrett et al. | |
| 3,745,828 A | 7/1973 | Howell | |
| 4,770,545 A * | 9/1988 | Takada et al. | 374/208 |
| 5,158,128 A | 10/1992 | Inoue et al. | |

FOREIGN PATENT DOCUMENTS

| | | |
|---|---|---|
| DE | 22 29 274 | 8/1973 |
| JP | 61 232048 | 10/1986 |

* cited by examiner

*Primary Examiner* — Lisa Caputo
*Assistant Examiner* — Punam Roy
(74) *Attorney, Agent, or Firm* — Lucas & Mercanti, LLP; Klaus P. Stoffel

(57) ABSTRACT

The present invention is based on the object of enhancing a known positioning device such that it also enables the use of rod-shaped measuring devices having a uniform length, even for measuring points located at varying depths of an object, such as an extrusion die. This object is achieved according to the invention in that a sleeve is provided, which is connected at an axial extension to the distal end of the cylindrical guide element from the object, and in which the spring element and the measuring apparatus are also guided, and that the second stop for the spring element can be axially displaced beyond the distal end of the cylindrical guide element from the object with the help of the sleeve, and fixed.

14 Claims, 4 Drawing Sheets

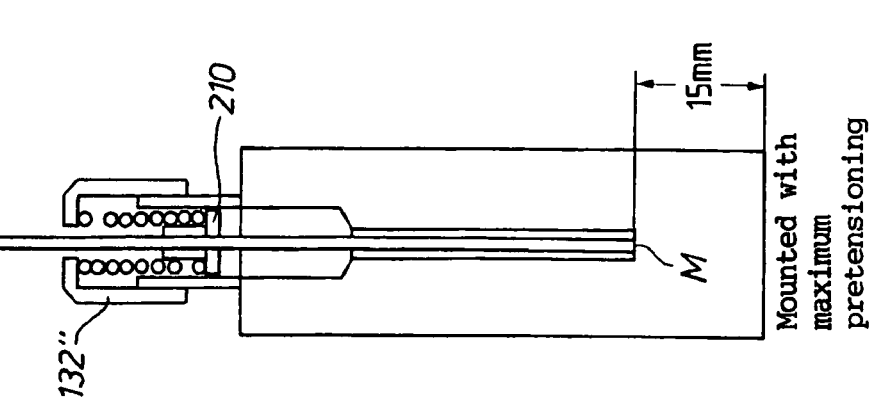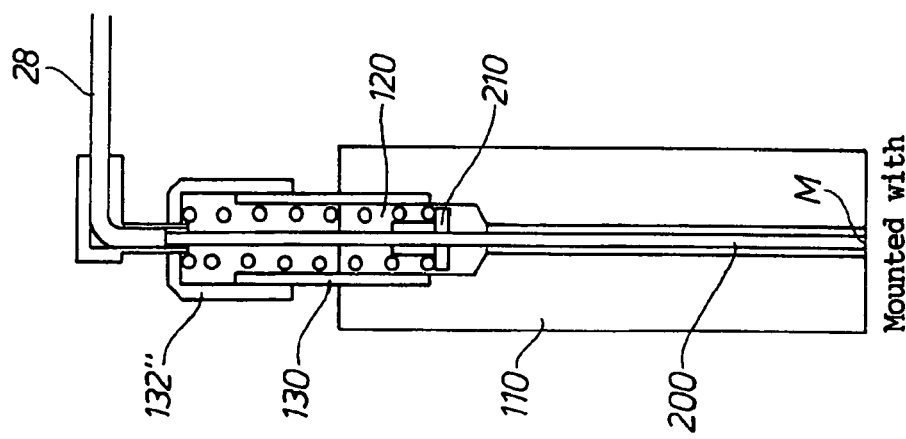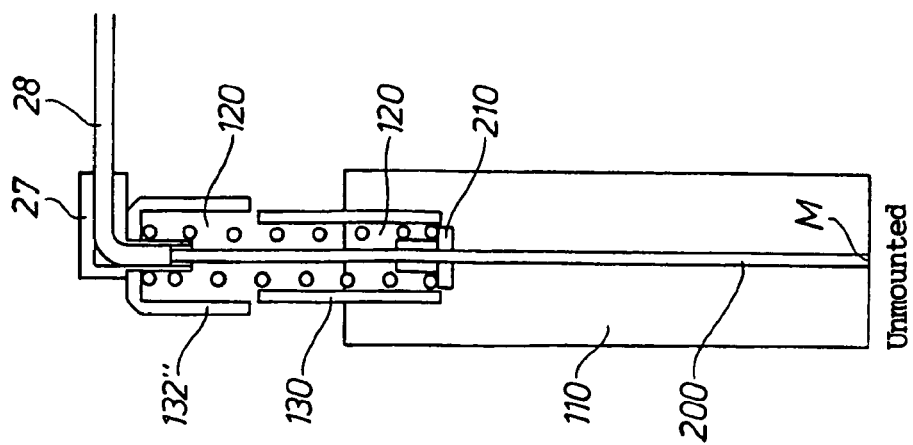

POSITIONING DEVICE FOR A ROD-SHAPED MEASURING APPARATUS

The invention concerns a positioning device for a rod-shaped measuring apparatus, e.g., a thermocouple, for determining a measured quantity at a measuring point of an object, e.g., a continuous casting mold.

A positioning device of this type is disclosed, for example, by U.S. Pat. No. 3,745,828. This positioning device is mounted in the outer wall of a double-wall mold. A cooling liquid is present between the two walls of the mold. To this extent, said outer wall of the mold is comparable to the wall of a water tank placed on the rear side of a single-wall mold. According to the cited US patent, the positioning device comprises a tubular housing/guide element, which is securely anchored in the outer wall. A temperature-sensing device is guided through the tubular housing and the cooling liquid to a measuring point inside the first wall of the mold. The tubular housing/guide element serves not only to guide the thermocouple but also to guide a spring element, which is realized as a compression spring and is mounted between two stops. One of the stops is permanently connected with the thermocouple, while the other stop is spatially permanently assigned to the tubular housing. In this design, the compression spring is supported on the second stop or the tubular housing and presses the thermocouple against the measuring point with well-defined pretensioning.

This pretensioning produces good contact of the thermocouple, even under unfavorable surrounding conditions, such as relatively small inaccuracies in the depth of boreholes on the rear side of the first mold wall or if the basically constant distance between the inner and outer walls of the mold should increase due to thermal effects. The spring displacement of the compression spring is generally only a few millimeters and therefore is only suitable for compensating fairly small inaccuracies.

In practice, however, the boreholes for the measuring points on the rear side of the mold are generally variably deep; the depth of the boreholes can vary, e.g., between 10 and 60 mm. Due to its only relatively short spring displacement, the previously known positioning device described above is not suitable for compensating this large amount of variation of the depth of the boreholes. Accordingly, a supplier must keep a variety of thermocouples on hand, each in a variety of lengths for the different borehole depths. During installation, this large number of thermocouples of different lengths, which often differ by only a few millimeters, can lead to mix-ups and incorrect installation, which then often leads to incorrect measurements.

The objective of the invention is to further develop a previously known positioning device for a rod-shaped measuring apparatus in such a way that it allows the use of rod-shaped measuring apparatus of uniform length, even for measuring points situated at different depths in an object, such as a continuous casting mold.

This objective is achieved by the object of claim 1. The object of claim 1 is characterized by the fact that a sleeve is provided, which is connected in axial extension to the terminal end of the cylindrical guide element with respect to the object, e.g., a continuous casting mold, and in which the spring element and the measuring device are also guided, and by the fact that the second stop for the spring element can be axially displaced, together with the sleeve, beyond the terminal end of the cylindrical guide element with respect to the object, e.g., a continuous casting mold, and can be fixed in place.

The sleeve provided for in accordance with the invention has the advantage that is allows displacement of the second stop for the spring element in the axial direction of the guide element according to the given depth of a borehole, into which a rod-shaped measuring apparatus is to be inserted. Due to the possibility of axial displacement of the second stop for the spring element, measuring devices of equal length can now be used for each borehole in the rear wall of the mold, regardless of the depth of each individual borehole. This eliminates the danger of confusion with the assignment of individual measuring devices of different length to certain boreholes. Moreover, the displaceability of the second stop ensures that despite the use only of measuring devices of preferably uniform length, the correct pretensioning can always be set in each individual case as a function of each individual borehole depth. At the same time, the necessary contact between the tip of the measuring device and the point of measurement inside the mold is thus also ensured in each case. Naturally, as an alternative to the use of measuring devices with only one uniform length, it is also possible to use measuring devices with a variety of standard lengths.

The sleeve can be connected to the cylindrical guide element, for example, by a first thread. The first thread allows variable adjustment of the length by which the sleeve extends beyond the terminal end of the cylindrical guide element with respect to the object. To this extent, the first thread also allows variation or adjustment of the displacement length by which the second stop can be axially displaced beyond the terminal end of the cylindrical guide element with respect to the object and can be fixed in place. Alternatively, the sleeve could also be connected to the cylindrical guide element by a bayonet mount. The bayonet mount would have the advantage that it does not have a thread, which is susceptible to fouling and would be exposed to the corrosive environment that exists during the operation of the mold, and that it also allows mounting and dismounting of the guide element and the thermocouple manually without tools. The bayonet mount can also be realized as a multiple-finger groove unit. As an additional alternative, the sleeve could also be permanently joined with the guide element, e.g., by welding, or it could be formed as a single piece with the guide element.

In the present invention, the second stop is designed as a disk-shaped aperture plate with a central aperture. The purpose of the central aperture is to allow the rod-shaped measuring apparatus and/or its cables to be passed through. Beyond the central aperture, the aperture plate serves as the stop for the spring element.

In accordance with a first embodiment, two projections, which are guided in a slot in the sleeve, are formed on opposite sides of the aperture plate. The aperture plate can be axially positioned by means of a nut, which engages with a second thread of the slotted sleeve and by which projections act on the aperture plate.

In accordance with a second embodiment, the aperture plate itself is designed as a cap, preferably a screw cap, which can be fastened to the terminal end of the sleeve with respect to the object. The length of the thread of the screw cap offers another possible means of variable adjustment of the displacement length, within which the second stop can be axially displaced beyond the terminal end of the cylindrical guide element with respect to the object and can be fixed in place. Alternatively, the cap could also be fastened to the sleeve with a bayonet mount, and the advantages that were mentioned earlier for the bayonet mount would likewise apply here.

In both embodiments, the terminal end of the rod-shaped temperature-sensing device with respect to the object, beyond the aperture plate, can have a clamping cap for bending cables of the measuring device, e.g., by 90°. This has the advantage that the required overall depth can be further shortened, so that more space is available for lengthening the spring displacement.

Furthermore, it is advantageous if the jacket of the rod-shaped measuring apparatus is reinforced, for example, in the area of the spring element and/or in the area of the apertures of the aperture plate, because the reinforcement avoids the risk of unintended damage or bending of the measuring device or its cables in the area of action of the spring element or the aperture plate.

Another advantage to be noted is that the sleeve of the invention can also be easily retrofitted in existing mold systems, so that the specified advantages can be realized even in existing systems.

In the positioning device of the invention, the spring element is supported inside the cylindrical guide element and the sleeve. The sleeve is closed by the second stop, especially in the form of a cap. This has the advantage that the spring element is protected from the effects of unfavorable environmental conditions, such as dirt, water vapor and incrustation with casting flux, and, especially, that it is protected from corrosion. To provide protection from corrosion, it is also advantageous if the positioning device or its components and especially the spring element are made of corrosion-resistant materials, such as stainless steel, copper, etc., or are provided with anticorrosive coatings.

The specification is accompanied by eight figures.

FIGS. 5a) to 5c) show schematic cross sections through the positioning device of the invention in accordance with a second embodiment in the unmounted state and in the mounted state with different pretensioning.

FIGS. 6a) and 6b) show schematic cross sections through the positioning device of the invention in accordance with the second embodiment with a first variant for compensation of 30 mm.

FIGS. 7a) and 7b) show cross sections through the positioning device in accordance with the second embodiment with a second variant for compensation of 30 mm.

The invention is described in detail below with reference to the figures. In all of the figures, mechanical elements that are the same are identified by the same reference numbers.

The two embodiments of the present invention which are presented below realize the core idea of the invention, namely, displacement and fixation of the second stop for the spring element beyond the terminal end, with respect to the mold, of the cylindrical guide element in the form of an expansion bolt. They differ only in the design of the second stop 132 and the sleeve 130.

The first embodiment will be described first with reference to FIGS. 1 to 4.

Figure 1:
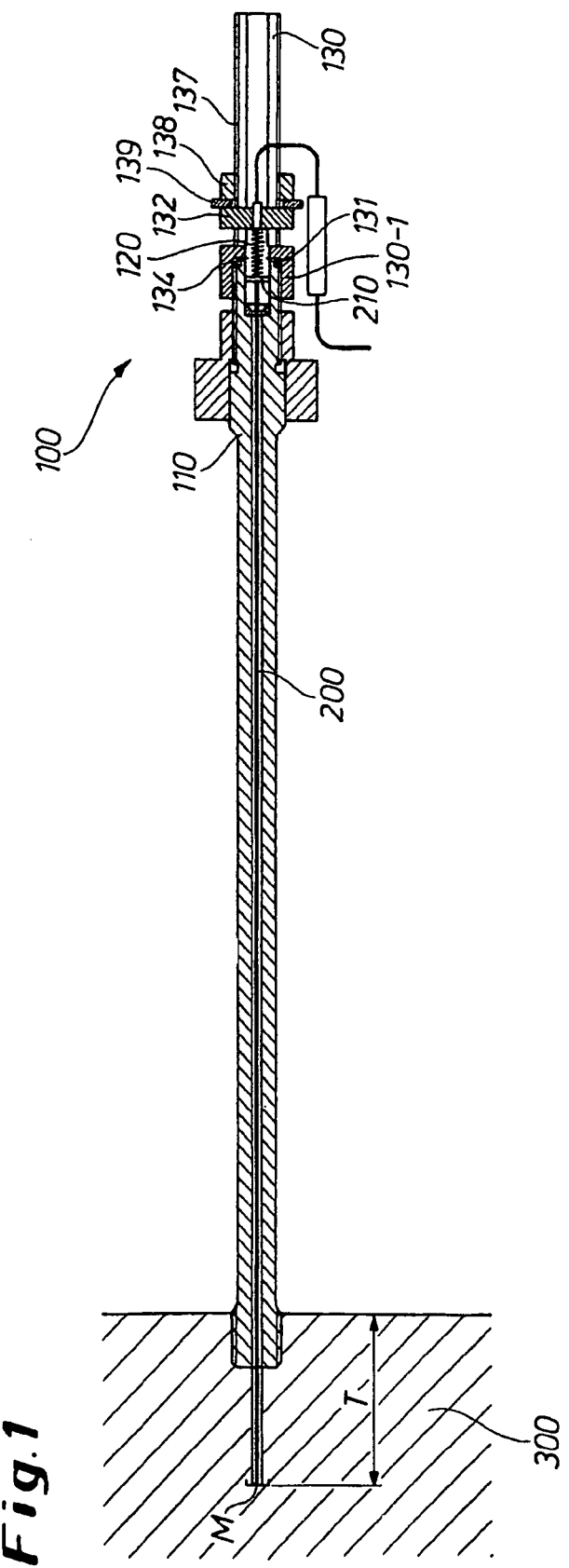
FIG. 1 shows a first embodiment of the positioning device of the invention.

FIG. 1 shows a cross section through the object in the form of a continuous casting mold 300, the rear side of which is bolted to a water tank (not shown) by means of a cylindrical guide element 110 in the form of an expansion bolt. The expansion bolt 110 has a longitudinal bore, through which a rod-shaped measuring apparatus 200, for example, a temperature-sensing device, e.g., in the form of a thermocouple, is guided from the rear side of the water tank into the borehole in the rear side of the continuous casting mold. The mold end of the thermocouple 200 makes contact there with a measuring point M. Typically, a plurality of measuring points at different depths is located on the rear side of the continuous casting mold 300. The expansion bolt 110 is permanently bolted not only in the wall of the water tank but also in the rear side of the mold and to this extent is spatially permanently assigned to the mold. At its end remote from the mold, the expansion bolt is drilled out to receive a first stop 210, which is permanently joined with the thermocouple, and to receive a spring element, which is guided coaxially with the thermocouple and is realized here, for example, as a compression spring that presses against the first stop 210.

In accordance with the invention, a sleeve 130 is connected in axial extension to the terminal end of the expansion screw 110 with respect to the mold. This connection can be detachable or permanently secured. In the case of a detachable connection, the head 130-1 of the sleeve 130 is either designed as a clamping element, preferably as a bayonet mount, or, as shown in FIG. 1, it is provided with an internal thread. The sleeve 130 can then optionally be sealed from the terminal end of the expansion bolt 110 with respect to the mold, for example, by means of an annular seal 131. For the purpose of realizing a permanent connection, the sleeve is formed, e.g., as a single piece with the cylindrical guide element or is welded with it.

Figure 2:
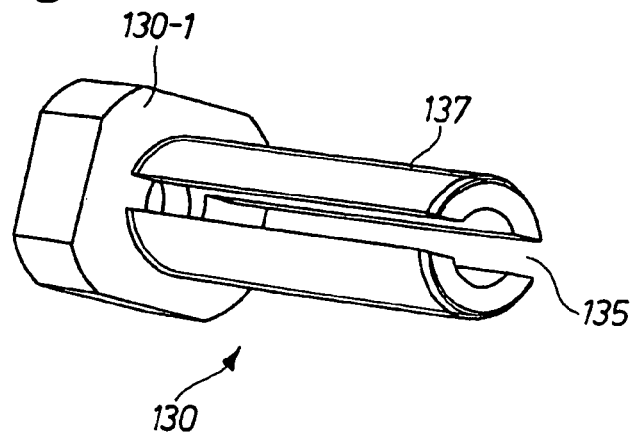
FIG. 2 shows a sleeve of the invention in accordance with the first embodiment.

The sleeve of the invention in accordance with the first embodiment is shown in FIG. 2. The drawing shows that the sleeve has the aforementioned head 130-1, to which a cylindrical body is attached.

Figure 3:
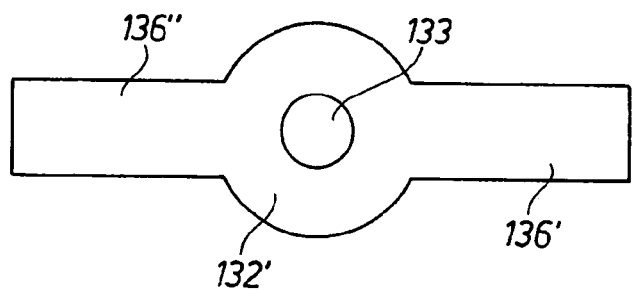
FIG. 3 shows an aperture plate as the second stop for a spring element in accordance with the first embodiment.

In the first embodiment, the second stop 132 is designed as an aperture plate 132' with two projections 136' and 136" (see FIG. 3). The sleeve 130 is provided with a slot 135. The aperture plate 132' can be axially displaced inside the sleeve, with the projections 136', 136" being guided in the slot 135. The second stop in the form of the aperture plate 132' can be adjusted to any desired position within the sleeve. This adjustment is made with a threaded nut 138, which engages an external thread 137 on the sleeve 130. The threaded nut 138 ideally acts directly on the aperture plate via a washer 139 and the projections 136', 136". During each adjustment operation, the thermocouple 200 is supported on the measuring point M in the mold 300, while at the same time it is being pressed against the measuring point M by the spring element 120 and the first stop 210. By turning the threaded nut 138, it is possible, for each different borehole depth, suitably to adjust a desired pretension, with which the thermocouple is to be pressed against the measuring point, and in this way to ensure reliable contacting.

Figure 4:
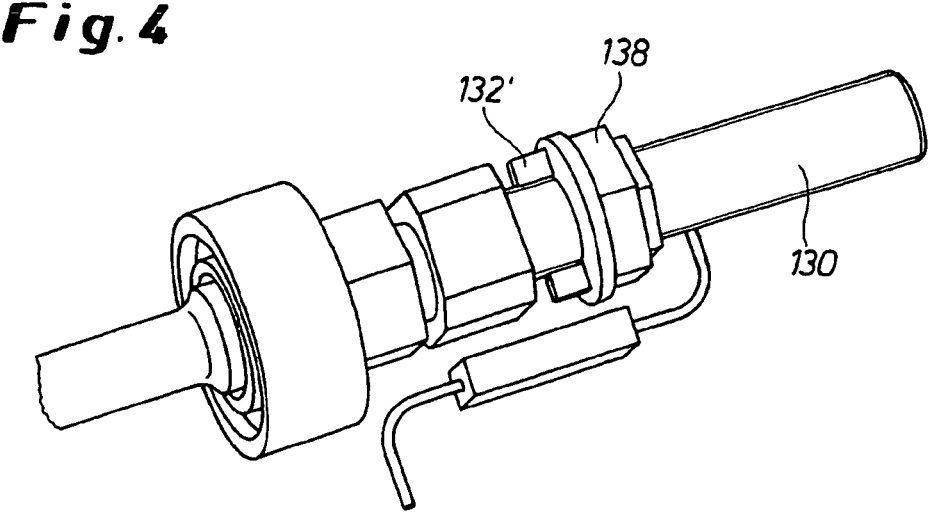
FIG. 4 is a perspective view of the positioning device in accordance with the first embodiment.

FIG. 4 shows a perspective view of the positioning device of the invention that is shown in FIG. 1.

In the second embodiment, the sleeve 130, which can also be referred to as a threaded fitting, is typically not slotted, although a slot would not have any adverse effect. In contrast to the first embodiment, the second stop in the form of the aperture plate 132" is designed as a cap, preferably a screw cap, which can be screwed onto the terminal end of the sleeve 130 with respect to the object (see FIGS. 5a), b) and c)). Alternatively, the cap can be mounted on the terminal end of the sleeve 130 with respect to the object with a bayonet mount. In both cases, the detachable cap is preferably sealed from the sleeve with an O ring.

FIG. 5a) shows the positioning device of the invention in accordance with the second embodiment, with the sleeve 130 or the threaded fitting screwed into the terminal end of the expansion bolt 110 with respect to the object, but with the cap 132" in its unmounted state. The thermocouple 200 rests against the measuring point M inside the mold and extends beyond the sleeve 130 without being pretensioned. At the terminal end of the temperature-sensing device 200 with respect to the object, the temperature-sensing device 200 is guided through the opening inside the screw cap 132", and its outgoing cable 28 is bent by means of a clamping cap 27. The spring element 120 is mounted inside the sleeve 130 and the screw cap 132" between the first stop 210, which is permanently connected with the temperature-sensing device 200, and the second stop formed by the screw cap, but in FIG. 5a), the spring element is not in its pretensioned state.

FIG. 5b) shows essentially the same arrangement as FIG. 5a) but with the difference that the screw cap 132" is now screwed onto the sleeve 130. Because the screw cap 132", as has been stated, acts as the second stop for the spring element 120, the spring displacement has now been shortened by the screwing on of the screw cap, so that the temperature-sensing device 200 is caused to press against the measuring point M with light pretensioning. This pretensioning guarantees that contact is always present between the measuring-point end of the temperature-sensing device and the measuring point.

FIG. 5c) shows the positioning device of the invention in accordance with the second embodiment in the same mounted state as in FIG. 5b) but this time for a measuring point M situated 15 mm higher in the mold. With the use of the same sleeve 130 and the same screw cap 132", this has the effect that the first stop 210 moves, together with the thermocouple 200, towards the second stop, which, in the present case, results in maximum compression of the spring element and thus maximum pretensioning for the thermocouple. The different position of the measuring point M in FIGS. 5b) and 5c) was compensated in FIG. 5c) solely by a reduction of the spring displacement. If this leads to the spring element being completely compressed, as shown in FIG. 5c), then the spring element loses its flexibility, which is generally undesirable.

Figure 6:
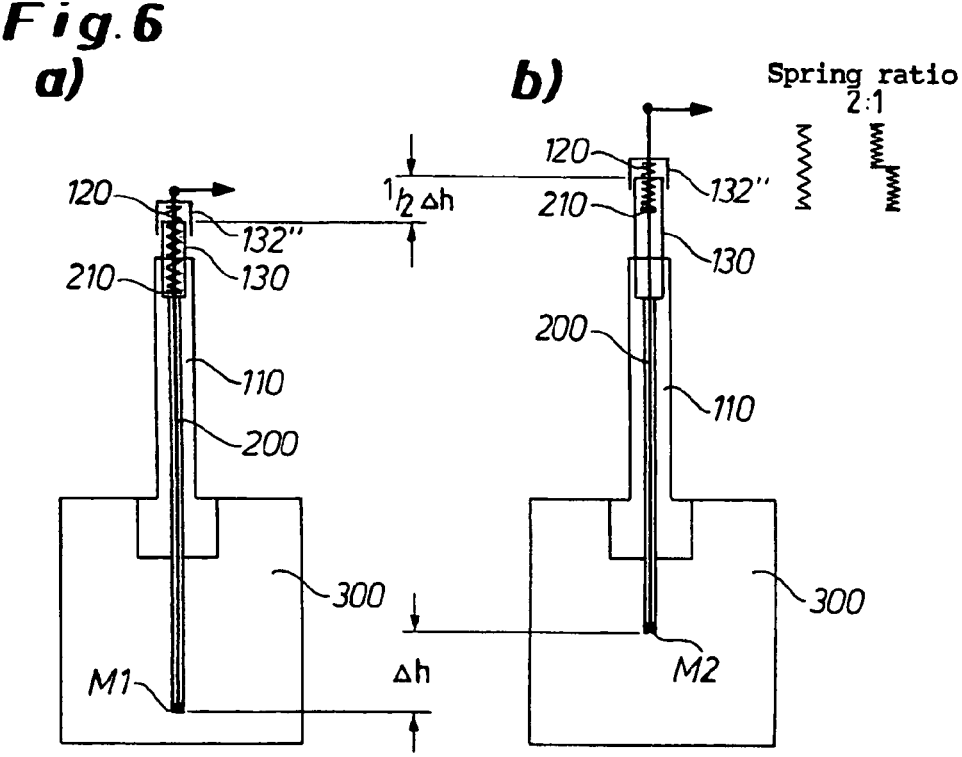

FIG. 6 shows a possible means of avoiding complete compression or deadlock of the spring element, even at large height/depth differences between two different measuring points. To this end, by way of example, the sleeve 130 in FIG. 6b) is formed longer than the sleeve in FIG. 6a) by half the height difference Δh. At the same time, the spring displacement between the first stop 210 and the second stop in the form of the screw cap 132" is shortened by half in FIG. 6b) compared to FIG. 6a). The shortening of the spring displacement in FIG. 6b) leads to an increase in the pretensioning of the temperature-sensing device 200 towards the measuring point M2, i.e., to a changed spring ratio of 2:1. However, the spring element 120 in FIG. 6b) is not yet fully compressed, so that, if necessary, it is still able to respond elastically.

Figure 7:
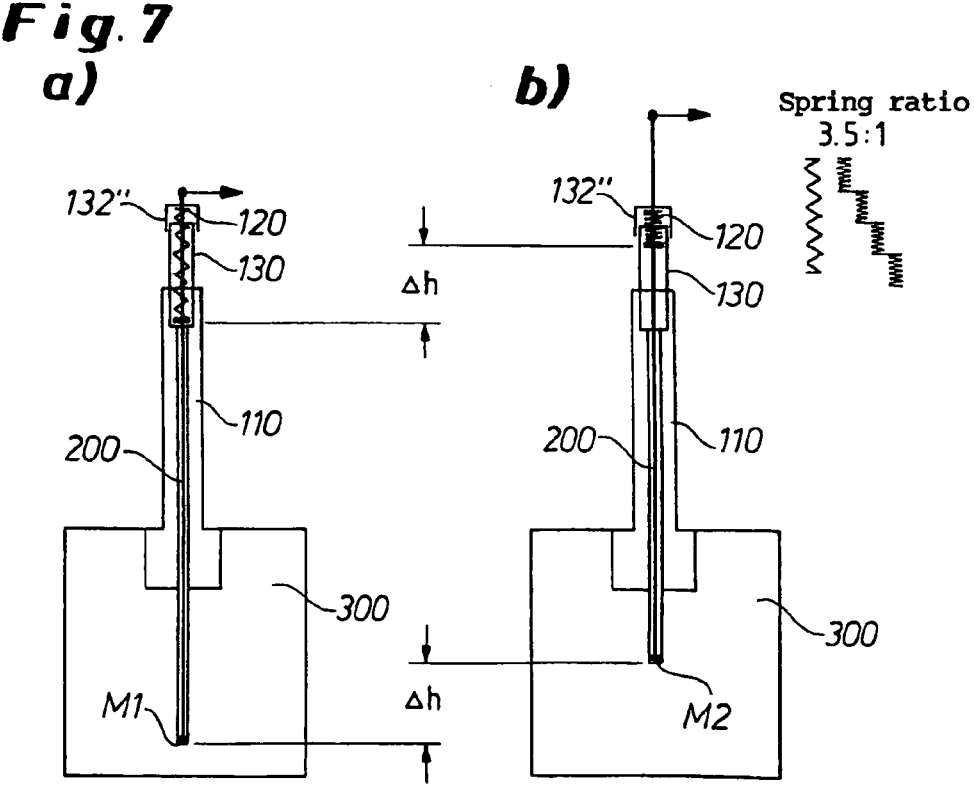

FIG. 7 shows another variant of the second embodiment. In this variant, the height difference Δh between the measuring points M2 and M1 within the mold, similarly to FIG. 5, is compensated solely by a correspondingly great shortening of the spring displacement between the first stop 210 and the second stop in the form of the screw cap 132". The length of the sleeve 130 and the position of the screwed-on screw cap 132" remain unchanged in FIG. 7b) compared to FIG. 7a). Between these two figures, there is a changed spring ratio of 3.5:1.

In both embodiments of the invention, the second stop 132 in the form of a disk-shaped aperture plate or in the form of the screw cap is formed with a central opening 133. The thermocouple 200 or its outgoing cable 28 passes through this central opening.

In both embodiments of the invention, it is advantageous if the jacket of the thermocouple 200 or the thermocouple itself is reinforced in the area of the spring element, which acts as a compression spring, preferably reinforced against buckling, in order to avoid wear of the insulation in the form of the jacket and thus to avoid possible malfunctioning of the thermocouple.

In both embodiments of the invention, the thermocouple can have a clamping cap 27 at its end remote from the mold beyond the second stop or the aperture plate for the purpose of bending the outgoing cable 28 of the thermocouple.

In both embodiments, the length of the sleeve should be chosen large enough to allow spring displacements in a range of 5-60 mm; this range of spring displacements is typical for use of the invention in continuous casting molds.

The invention claimed is:

1. A positioning device (100) for a rod-shaped measuring device (200) for determining a measured quantity at a measuring point (M) of an object (300), with a cylindrical guide element (110), in which the measuring device (200) is guided in such a way that it contacts the measuring point (M), and with a spring element (120), which is mounted between a first stop (210) that is connected with the measuring device (200) and a second stop (132), for pressing the measuring device against the measuring point (M), wherein a sleeve (130) is provided, which is connected in axial extension to the terminal end of the cylindrical guide element (110) with respect to the object and in which the spring element (120) and the measuring device (200) are guided, wherein the second stop (132) is designed as a disk-shaped aperture plate (132') with a central aperture (133), through which the rod-shaped device (200) is passed, and where the second stop (132, 132') for the spring element (120) is axially displaceable, together with the sleeve (130), beyond the terminal end of the cylindrical guide element (110) with respect to the object, and is adjustable to and fixable in place in any desired position on the sleeve.

2. A positioning device in accordance with claim 1, wherein the sleeve (130) is connected to the cylindrical guide element by a first thread (134) or a bayonet mount.

3. A positioning device (100) in accordance with claim 1, wherein the sleeve (130) is provided with at least one slot (135) and that the aperture plate (132) has at least one projection (136), which is guided in the slot.

4. A positioning device (100) in accordance with claim 3, wherein the slotted sleeve (130) has a second thread (137) and that the aperture plate (132) can be axially positioned by means of a nut (138), which engages the second thread (137) and acts on the aperture plate (132) via the projection (136).

5. A positioning device (100) in accordance with claim 1, wherein the second stop (132) in the form of the aperture plate is designed as a cap mounted on the terminal end of the sleeve with respect to the object.

6. A positioning device (100) in accordance with claim 1, wherein the cylindrical guide element (110) is a cylindrical expansion bolt, with which the object (300) in the form of a continuous casting mold is bolted onto a water tank.

7. A positioning device (100) in accordance with claim 1, wherein the rod-shaped measuring apparatus (200) is realized as a thermocouple for measuring the temperature as the measured quantity at the measuring point.

8. A positioning device (100) in accordance with claim 1, wherein the terminal end of the rod-shaped measuring apparatus (200) with respect to the object, beyond the second stop, has a clamping cap (27) for bending outgoing cables (28).

9. A positioning device (100) in accordance with claim 1, wherein the rod-shaped measuring apparatus has a jacket that is reinforced in the area of the spring element (120) and the second stop.

10. A positioning device (100) in accordance with claim 1, wherein the spring element is realized as a compression spring.

11. A positioning device (100) in accordance with claim 1, wherein at least some of the components of the positioning device, but including the spring element, are realized with anticorrosive protection.

12. A positioning device in accordance with claim 1, wherein the sleeve (130) and the cylindrical guide element (110) are formed as a single piece.

13. A positioning device in accordance with claim 8, wherein the clamping cap is configured to bend outgoing cables (28) by 90°.

14. A positioning device in accordance with claim 1, wherein the object is a continuous casting mold.

* * * * *